(12) United States Patent
Atnip et al.

(10) Patent No.: US 8,910,386 B2
(45) Date of Patent: Dec. 16, 2014

(54) MULTIPLE CUT ZONE BLADE ASSEMBLY FOR A HAND OPERATED CUTTING TOOL

(75) Inventors: Timothy Edward Atnip, Temecula, CA (US); Anthony Magana, Riverside, CA (US); James Wolf, Waconia, MN (US); Hyok Lee, Corona, CA (US); Jeffrey Robert Burger, Bexley, OH (US); Laura Winfield Alexander, Sunbury, OH (US); Sean Wesley Svendsen, Gahanna, OH (US)

(73) Assignee: Corona Clipper, Inc., Corona, CA (US)

( * ) Notice: Subject to any disclaimer, the term of this patent is extended or adjusted under 35 U.S.C. 154(b) by 302 days.

(21) Appl. No.: 13/099,229

(22) Filed: May 2, 2011

(65) Prior Publication Data

US 2012/0279072 A1    Nov. 8, 2012

(51) Int. Cl.
| | |
|---|---|
| *B26B 13/00* | (2006.01) |
| *B26B 19/08* | (2006.01) |
| *B26B 9/02* | (2006.01) |
| *B26B 13/06* | (2006.01) |
| *A01G 3/02* | (2006.01) |
| *A01G 3/025* | (2006.01) |
| *A01G 3/047* | (2006.01) |

(52) U.S. Cl.
CPC . *B26B 13/06* (2013.01); *A01G 3/02* (2013.01); *A01G 3/0251* (2013.01); *A01G 3/0475* (2013.01)
USPC ............ 30/194; 30/211; 30/244; 30/357

(58) Field of Classification Search
USPC ........ 30/309, 314, 131, 346, 356, 121.5, 194, 30/199, 196, 241–252, 261, 262, 92, 98, 30/99, 132, 120, 357; 83/918, 333
See application file for complete search history.

(56) References Cited

U.S. PATENT DOCUMENTS

| | | | | |
|---|---|---|---|---|
| 131,108 | A | * | 9/1872 | McElhaney ............... 30/254 |
| 352,561 | A | * | 11/1886 | Neff ................... 30/260 |
| 1,081,851 | A | * | 12/1913 | Michael ................. 452/64 |
| 1,520,529 | A | * | 12/1924 | Cagle .................. 30/254 |
| 1,597,859 | A | * | 8/1926 | Jardine ................. 30/346 |
| 2,557,506 | A | * | 6/1951 | Kovacevich ............. 30/259 |
| 3,672,053 | A | * | 6/1972 | Wiss .................. 30/267 |
| 4,434,555 | A | * | 3/1984 | Stoll ................... 30/92 |
| 4,649,646 | A | * | 3/1987 | Lemcke ................. 30/231 |
| 4,809,433 | A | * | 3/1989 | Maxwell et al. .......... 30/254 |
| 5,086,819 | A | | 2/1992 | Selby |
| 5,469,625 | A | | 11/1995 | Melter et al. |
| 5,560,107 | A | * | 10/1996 | Herbert ................ 30/90.1 |
| 5,745,998 | A | | 5/1998 | Le et al. |
| 6,446,343 | B1 | | 9/2002 | Huang |
| 6,813,835 | B2 | * | 11/2004 | Deville ................. 30/254 |

(Continued)

*Primary Examiner* — Sean Michalski
*Assistant Examiner* — Jonathan G Riley

(57) ABSTRACT

A hand pruner having a first and second handle, the first handle having a hook, formed at a far end, the second handle having a cutting blade formed at the far end. The first handle and hook and second handle and blade pivotally connected for movement with respect to each other. The blade and second handle having a cup formed between the blade and second handle. The hook and first handle having a cup formed between the hook and first handle. The cutting edge of the hook is formed along two concave intersecting arcs of different diameters, the smaller diameter arc located next to the pivot. The cutting edge of the blade is formed along two convex intersecting arcs having diameters that complement the two concave arcs in the hook cutting edge.

4 Claims, 8 Drawing Sheets

(56) References Cited

U.S. PATENT DOCUMENTS

| | | |
|---|---|---|
| 6,829,829 B1 | 12/2004 | Huang |
| 7,127,819 B1 * | 10/2006 | Huang ............... 30/92 |
| 7,640,666 B1 * | 1/2010 | Huang ............... 30/234 |
| 8,074,361 B2 * | 12/2011 | Bohlman et al. ............... 30/134 |
| 2002/0148118 A1 * | 10/2002 | Chang ............... 30/92 |
| 2003/0167640 A1 | 9/2003 | Heck et al. |
| 2006/0026800 A1 * | 2/2006 | Lawless ............... 16/430 |
| 2007/0193035 A1 * | 8/2007 | Feith ............... 30/92 |

* cited by examiner

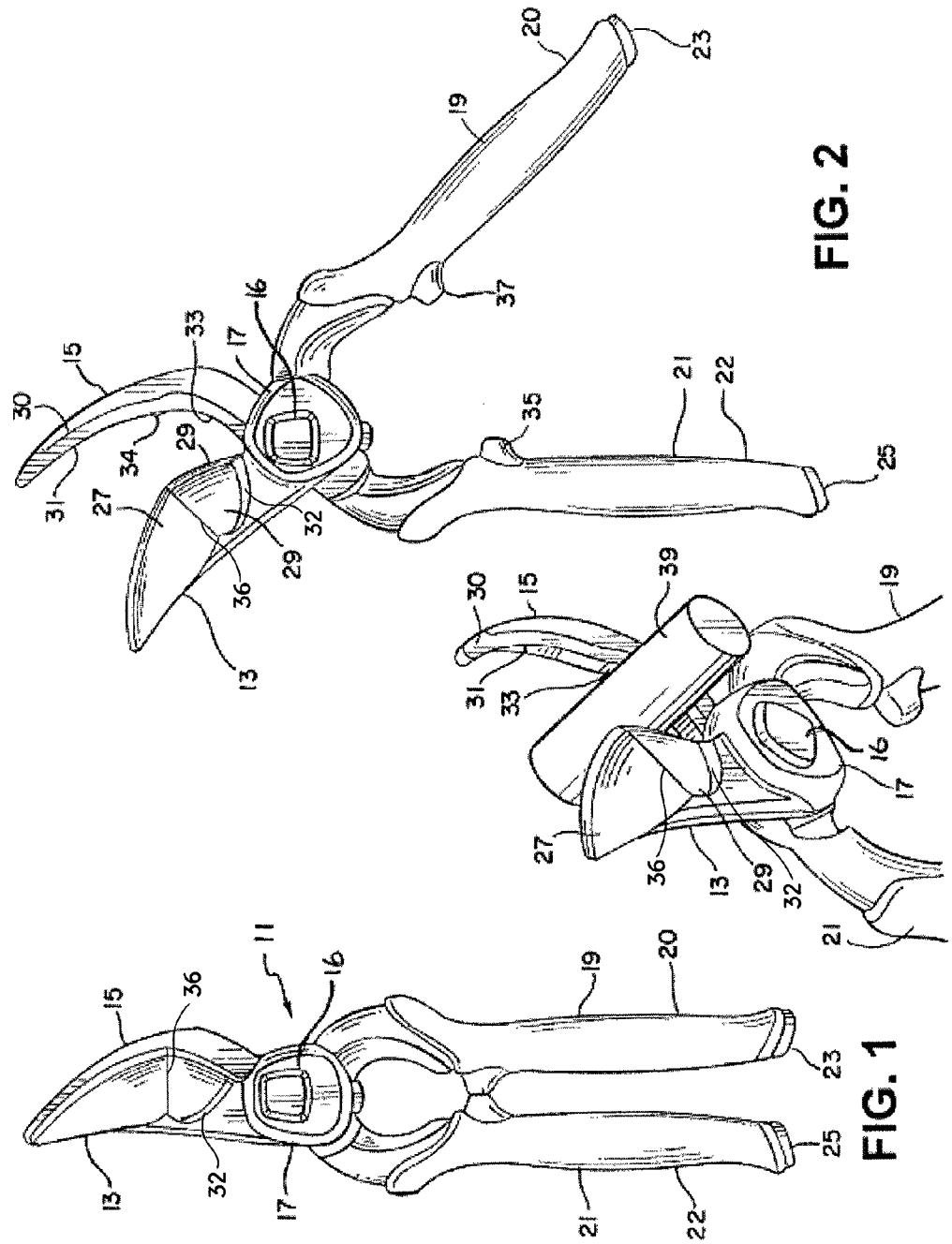

MULTIPLE CUT ZONE BLADE ASSEMBLY FOR A HAND OPERATED CUTTING TOOL

BACKGROUND OF THE INVENTION

1. Field of the Invention

The present invention relates generally to improvements in hand operated cutting tools and more particularly pertains to new and improved blade assemblies for hand operated cutting tools.

2. Description of Related Art

In the field of hand operated cutting tools, it has been the practice to use standard bypass, hook and blade, and anvil type cutting blades. Significant design effort has been directed to providing mechanisms that connect the handles and blades and reduce the force required on the handles to cause those standard blade arrangements to cut a standard maximum diameter branch.

U.S. Pat. No. 5,469,625, granted on Nov. 28, 1995 to Craig H Melter et al. for a Compound Action Hand Pruner, shows a hand pruner using a force multiplying linkage between a handle and the hook, of a hook and blade arrangement, to provide maximum cutting force between the hook and blade, before the hook and blade actually engage.

U.S. Pat. No. 6,829,829 granted Dec. 14, 2004 to Huang for Gardening Pruner Provided With Means To Effectuate Efficient Transmission Of Force From Handles To Blades Thereof shows a hand pruner using two pivoting plates with gear teeth to engage gear teeth on the two blades. The gear teeth transfer force from the handles to the blades causing enhanced transmission of force from the handles to the blades.

U.S. Pat. No. 6,446,343 granted on Sep. 10, 2002 to Huang for Structure For Improving Efficiency of A Movable Jaw Of A Tree Pruner shows a hand operated tree pruner with a fixed jaw and a movable jaw pivoting with respect to the fixed jaw. The movable jaw is restricted in movement in order to improve cutting efficiency.

U.S. Pat. No. 5,745,998 granted May 5, 1998 to Le et al. for a Pruning Implement, shows a hand operated tree pruner with a hook and blade shearing mechanism wherein the blade pivots with respect to the hook by way of a leverage arm connected to the blade, thereby allegedly reducing the force required to cut the branch.

US published application 2003/0167640 published on Sep. 11, 2003 is an application by Edward Heck et al. for Pruners For Cutting Vegetation. This published application shows a hand operated pruner using a pair of blades mounted to the forward end of a body for relative movement with respect to each other. A lever that is pivotally mounted at the rearward end actuates one of the blades by way of a linkage in the body, thus providing a more efficient application of the cutting force.

It appears that modification of cutting blades arises only in the context of a mechanized cutting implement such as a mechanized tree pruner.

U.S. Pat. No. 5,086,819 granted Feb. 11, 1992 to John Selby for curved tree pruner blades shows the use of multiple concave face blades in a knife belt powered tree pruner in order to provide a closer pruning cut. The present invention requires reduced force to operate a hand operating cutting tool to cut branches having a variety of diameters.

SUMMARY OF THE INVENTION

A hand operated cutting tool having a first handle with a hook at a far end and a second handle with a cutting blade at a far end, the first and second handles being pivotally connected for movement with respect to each other. The cutting edge of the hook is formed along two overlapping concave arcs of different diameters. The smaller diameter concave arc is located near the pivotal connection. The cutting edge of the blade is formed along two overlapping convex arcs of different diameters, the diameters of the arcs selected to complement the concave two arc curvature of the hook cutting edge.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 1 is a side perspective of a preferred embodiment;

FIG. 2 is a side perspective of the embodiment of FIG. 1;

FIG. 3 is an angled front perspective of the embodiment of FIG. 1;

DETAILED DESCRIPTION OF THE PREFERRED EMBODIMENTS

Figure 4:
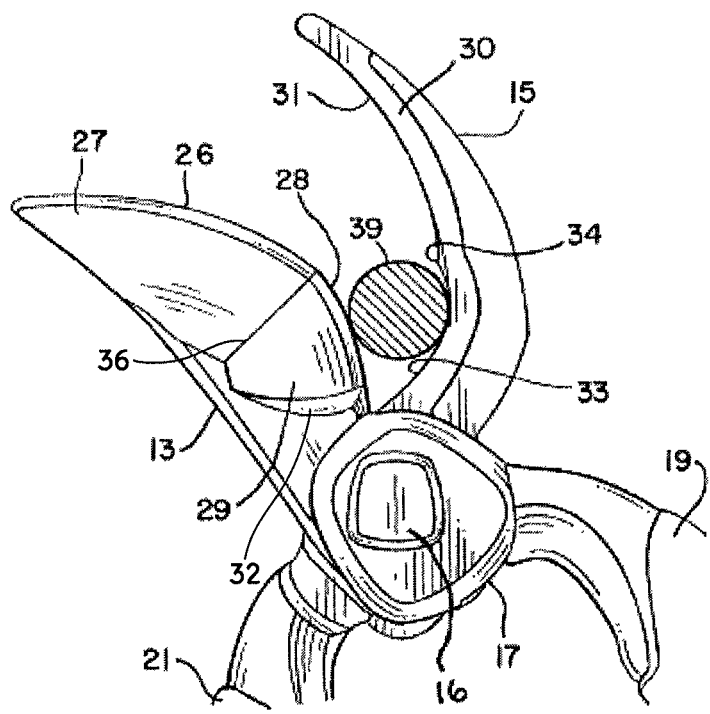
FIG. 4 is a partial front perspective of the blades of the embodiment of FIG. 1.

Referring to FIG. 1 which shows a preferred embodiment 11 of the invention used in a hand operated clipper having a bypass blade 13 and a hook 15. The hook 15 is connected to a first handle 21. The blade 13 is connected to a second handle 19. The blade-handle and hook-handle are connected pivotally for movement with respect to each other at pivot junction 17.

Each handle 19 and 20 preferably has a soft shock absorbent cover 20, 22. A pair of metal end caps 23, 25 are mounted at the respective ends of the handles in order to protect the handle covers 20 and 22 from damage due to falls or other inadvertent impacts.

FIG. 2 shows the embodiment of FIG. 1 with the cutting blades 13, 15 open, as it would be in preparation for cutting branches or plants. The handles 19 and 21 are spread apart. Cushioning bumpers 37 and 35 are located on the inside of the handles 19 and 21. These cushioning bumpers absorb any shock upon the handles 19 and 21 coming together, when a closing force is exerted on them. These bumpers are formed as part of the cushioning covers 20 and 22, respectively.

The embodiment shown in FIG. 2 illustrates a blade 13 and hook 15 arrangement wherein the blade engages a hook cutting edge 30 in a bypass manner. The cutting edge 30 is formed along two concave cutting arcs 33 and 31, that overlap at a point 34. The blade 13 is shaped into two distinct cutting sections 29 and 27 which have respective cutting edges 28 and 26 (FIG. 4). The cutting edges 26 and 28 are formed along two convex arcs, each being complementary to the respective concave arc 31, 33 of the cutting edge 30.

FIG. 3 shows the two arc cutting edge in the blade 13 and hook 15 cutting a twig or other three dimensional object 39 by holding the object 39 further back in the blade and hook, closer to the pivot 17.

FIG. 4 shows more clearly the capability of the embodiment of FIG. 1 to cut a large diameter branch 39. The cutting edge 33 on hook 15 is formed along a concave arc that has a smaller diameter than the arc of cutting edge 31. The two arcs intersect at a rise point 34. Rise point 34 acts as a stop to prevent the branch 39 from moving up the hook to the open end, as the blade 13 is forced down on branch 39. The cutting edge 28 of blade 13 is formed along a convex arc that complements the concave arc of the cutting edge 33 on the hook 15. This particular arrangement allows the hand operated clipper to cut a larger diameter branch 39 with the same exertion of force on the handles 19, 21 as would be required to cut much smaller diameter branches or twigs using the conventional single arc blade structure.

Because of the cutting edge 33 being more concave than cutting edge 31, less hand movement and less pressure is required to cut this larger diameter branch 39 than would be required if the entire cutting edge of hook 15 was along a single arc. Moreover, holding the branch 39 closer to the pivot 17, allows more pressure to be exerted on the branch 39.

Figure 5:
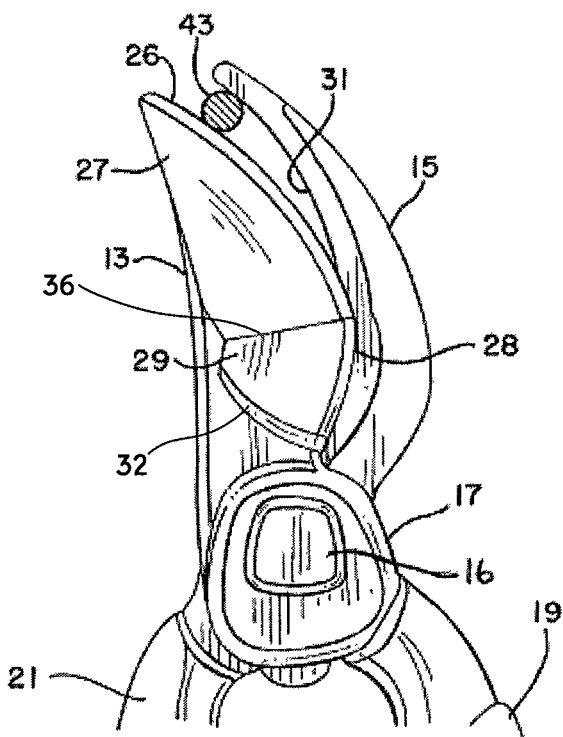
FIG. 5 is a partial front perspective of the blades of the embodiment of FIG. 1.

FIG. 5 illustrates the versatility of the blade arrangement of the embodiment of FIG. 1. The cutting edge 31 on hook 15 is formed along a much larger diameter concave arc than the cutting edge 33 (FIG. 4). The cutting edge 26 of the cutting section 27 of blade 13 is formed on a convex arc that is complementary to the concave arc of edge 31 on the hook 15. This arrangement allows the hand operating clipper to cut smaller diameter branches and vegetation 43 with relative ease, without exerting too much hand motion, or requiring significant hand movement.

The pivotal connection between blade 13 and hook 15 is located under a cover of a cup 16. The pivotal connection 17 which is a bearing, is the intersection of the blade handle 21 and hook handle 19. The cover or cup 16 creates a complete enclosure for a spring return mechanism (not shown). The spring return mechanism is arranged to open the handles and the blades so that force applied to the handles during a cut will be against the spring.

Figure 6:
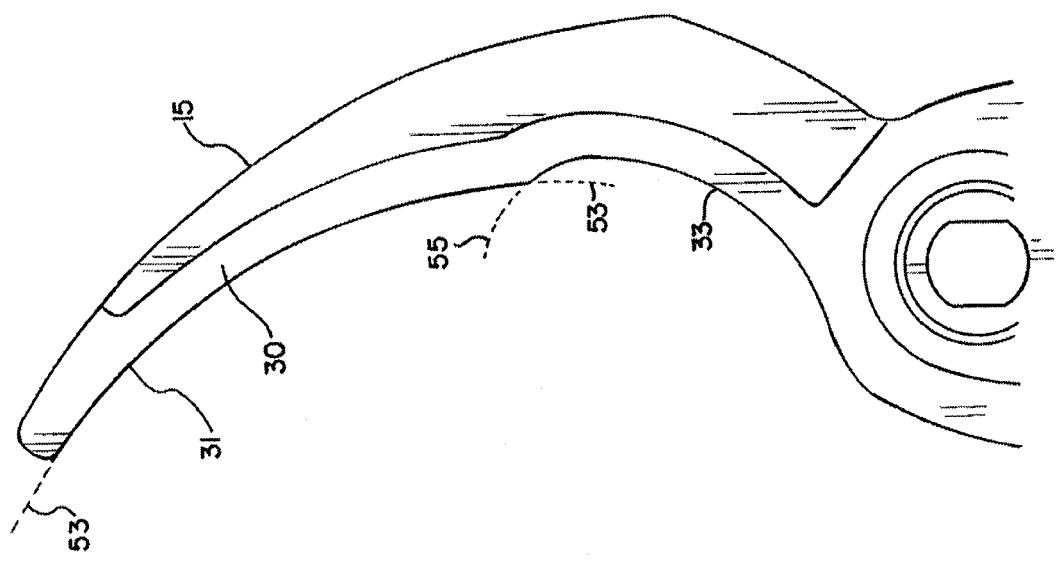
FIG. 6 is a side view of a preferred hook blade for the embodiment of FIG. 1.

FIG. 6 illustrates in greater detail the cutting edge 30 of hook 15 of the embodiment of FIG. 1. The cutting edge 30 is formed by causing it to lie along two intersecting concave arcs. The first cutting arc 33, which is closest to the handles, lies along an arc 55 having a predetermined diameter. The second cutting arc 31 lies along an arc 53 which has a larger diameter than the arc 55. The two arcs 53 and 55 intersect at a riser point 34. This point delimits the end of one cutting edge 33 and the start of another cutting edge 31. The riser 34 also acts as a stop to prevent objects between the riser 34 and the handles, upon being severed, from moving along the cutting edge of blade 15 toward the open end.

Figure 7:
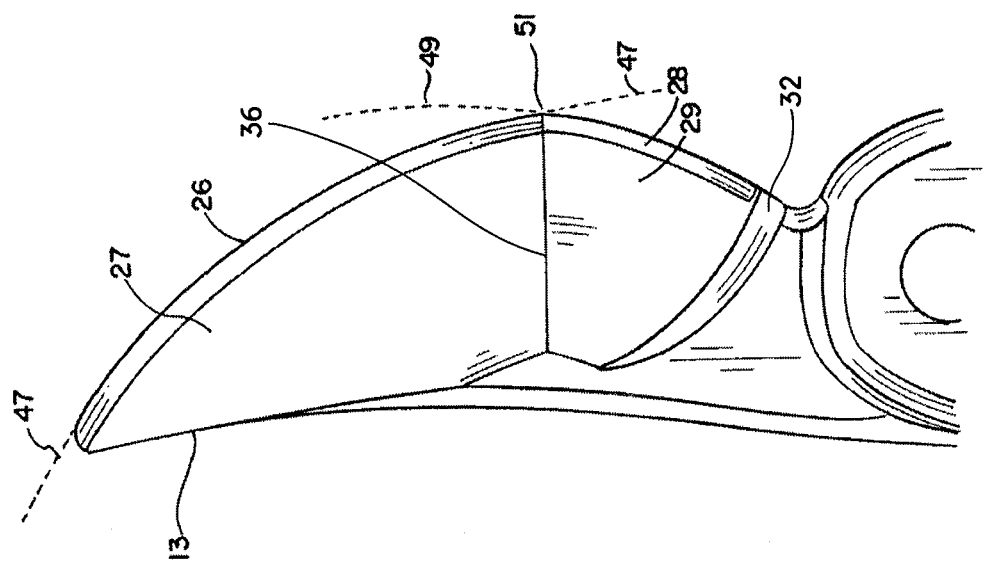
FIG. 7 is a side view of a preferred blade of the embodiment of FIG. 1.

The blade 13 of the embodiment of FIG. 1 is more clearly illustrated in FIG. 7 as shaped or ground on two distinct arcs. Blade section 29 is ground to have a convex cutting edge 28 that lies along arc 49. The diameter of arc 49 is preselected to create a cutting edge 28 that will readily trap an object to be cut between cutting edge 28 and cutting edge 33 of the hook. The shape of these cutting edges also facilitates cutting of larger objects. Blade section 27 of blade 13 is ground to have a convex cutting edge 26 that lies along arc 47. Arc 47 has a diameter that is larger than the arc 49 forming cutting edge 28. The diameter of arc 47 is chosen to complement the diameter of arc 53 of hook 15, to facilitate the cutting of smaller twigs and vegetation. The edge 26 along arc 47 is ground to intersect edge 28 along arc 49 at intersection 51. The blade 13 has a first side and a second side. The two cutting sections 27 and 29 intersect at a predetermined intersection line 36 aligned with the rise point 34 on the hook 15. The first cutting section 29 is ground on the first side to taper from the predetermined intersection line 36 to a ground intersection line 32 positioned proximal to the far end of the handles 19 and 21. The second cutting section 27 is ground on the first side to taper inwardly from the predetermined intersection line 36 to a tip end at the second cutting section 27.

Figures 8, 9:
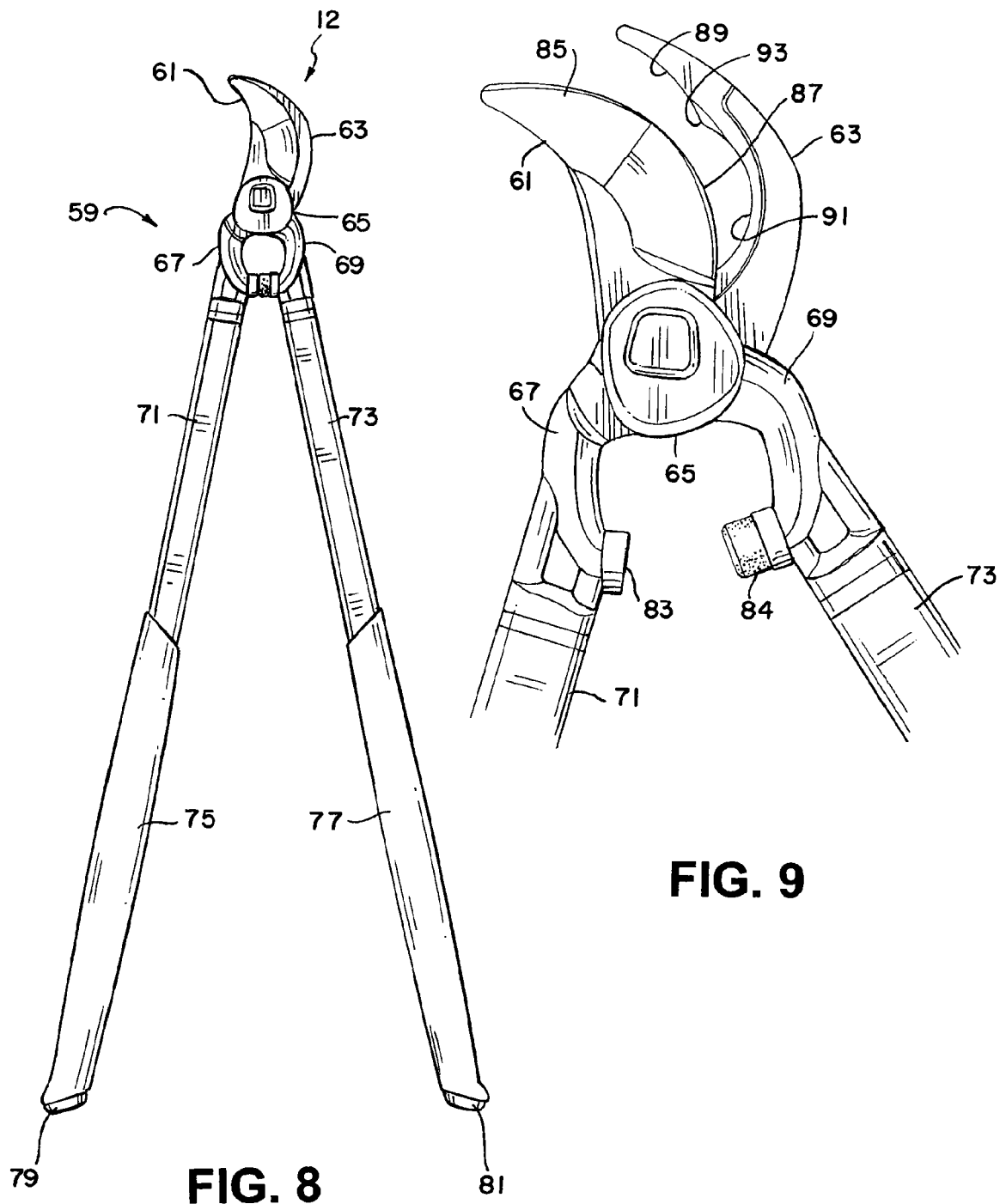
FIG. 8 is a front perspective of an alternate embodiment.
FIG. 9 is a partial front perspective of the blades of the embodiment of FIG. 8.

Referring now to FIG. 8, a second embodiment of the invention is illustrated, incorporated in a lopper 12 having lengthened extended handles 71, 73 with cushioned grips 75, 77 mounted thereon. Steel end caps 79, 81 are mounted on the ends of the cushioned grips to prevent damage to the cushioned grips as a result of inadvertent forces being applied, such as when the lopper 12 is dropped. The hook 63 of the lopper 12 has a leg 67. Blade 61 has a leg 69 which overlaps leg 67. The two legs 67 and 69 are pivotally connected at 65 where the two overlap. The pivotal connection 65 which forms a bearing is under cover of cups formed at the base of blade 61 and hook 63. The cups enclose both the pivotal bearing 65 and a spring biasing mechanism for biasing the handles 71, 73 open.

FIG. 9 illustrates in greater detail that the leg 67 of hook 63 has a knob 83 at its end. The leg 69 of the blade 61 has a bumper 84 at its end. The bumper cushions the impact of the two levers 71, 73 being brought together during cutting. The traditional way of operating the lopper 12 is with two hands, one hand on each of the cushioned covers 75, 77 of the levers 71, 73.

The blade 61 of the lopper is shaped into two different cutting sections with respective concave cutting edges 85, 87. The hook 63 has two different cutting sections with respective different concave cutting edges 91, 89. These cutting edges lie along arcs of different diameters. The concave arcs of the hook 63 intersect at a rise point 93.

Figure 10:
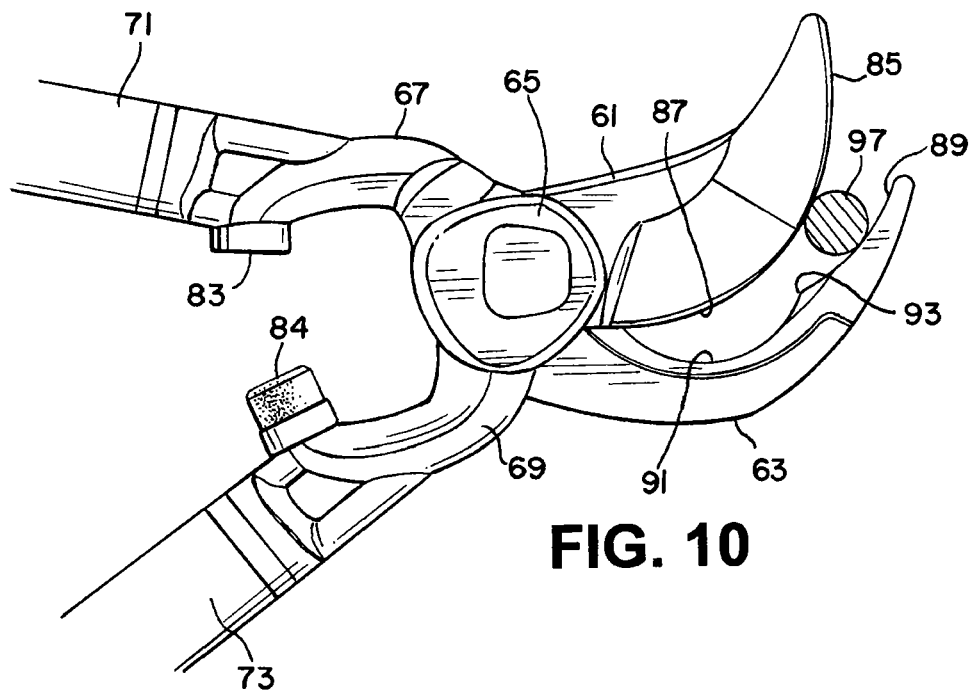
FIG. 10 is a partial front perspective of the blades of the embodiment of FIG. 8.

As can be seen in FIG. 10, the lopper embodiment of FIG. 8 is capable of cutting smaller diameter twigs and branches 97 in an area closer to the open end of the hook 63 and blade 61, between cutting edges 89, 85 of the hook 63 and blade 61. This requires less movement of the lever arms 71, 73 without increasing the pressure required to effectuate the cut.

Figure 11:
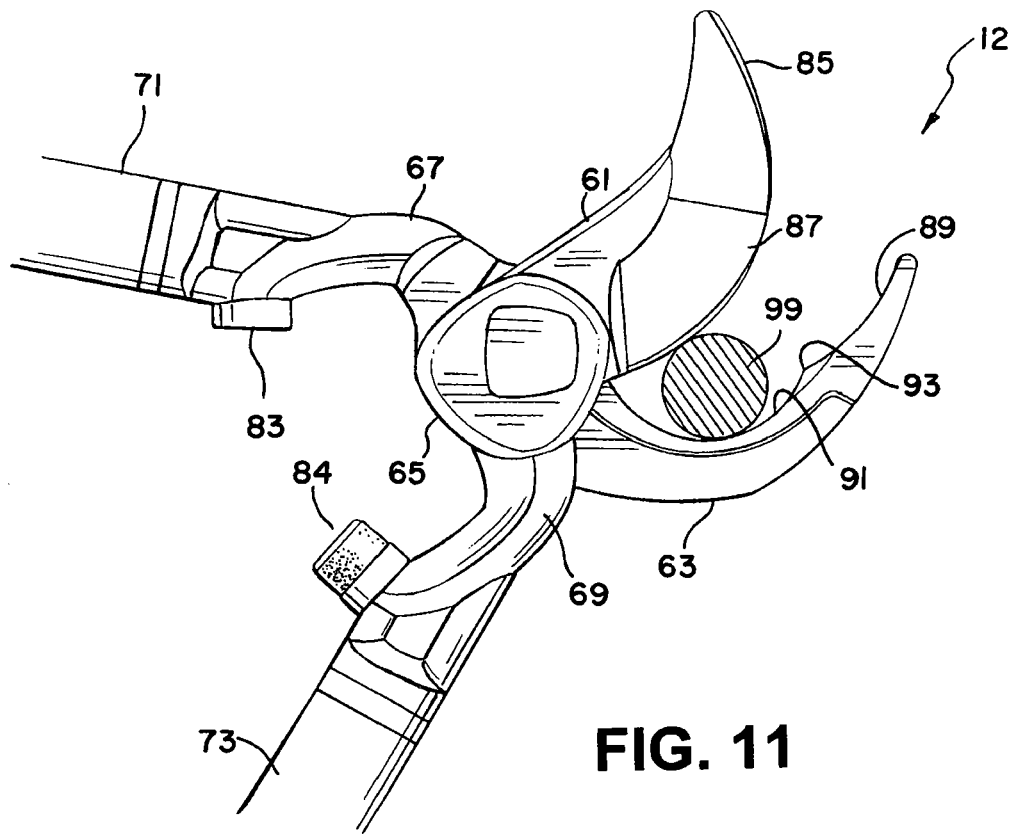
FIG. 11 is a partial front perspective of the blades of the embodiment of FIG. 8.

FIG. 11 illustrates the lopper 12 of FIG. 8 cutting a much larger diameter branch 99, between the blade 61 and hook 63, on the other side of rise point 93. The cut is made by cutting edge 87 of blade 61 and cutting edge 91 of hook 63.

Figure 12:
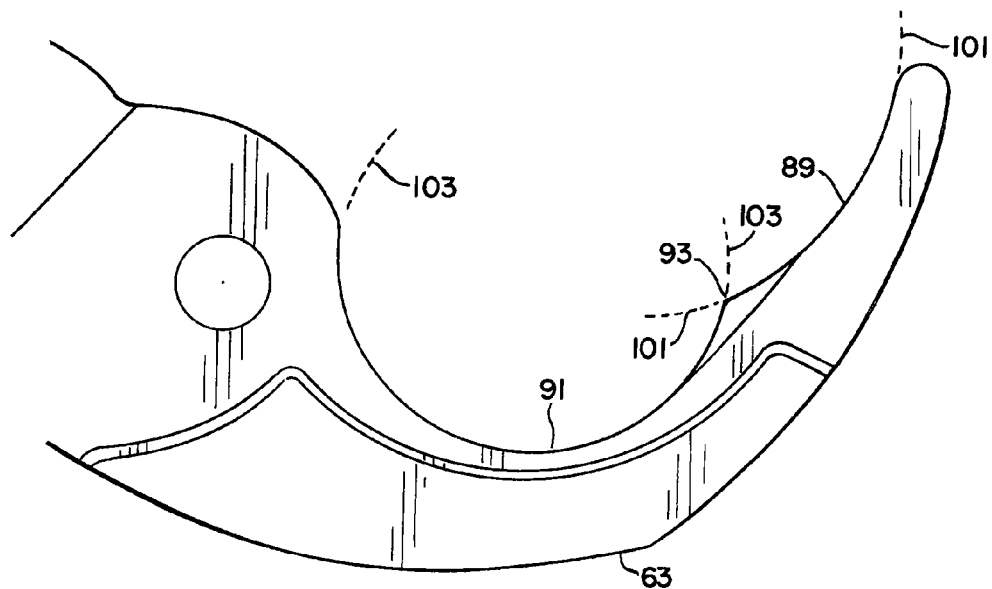
FIG. 12 is a front view of the hook blade for the embodiment of FIG. 8.

FIG. 12 shows the curvature of the two cutting edges 91 and 89 of the hook 63 in more detail. The cutting edge 91 lies along a concave arc 103 that has a predetermined diameter. The cutting edge 89 lies along a concave arc 101 that has a diameter that is larger than the diameter of the arc 103. The two arcs 101 and 103 define a cutting edge having two cutting areas separated by a rise point 93 in the middle of the hook cutting edge that acts as a stop.

Figure 13:
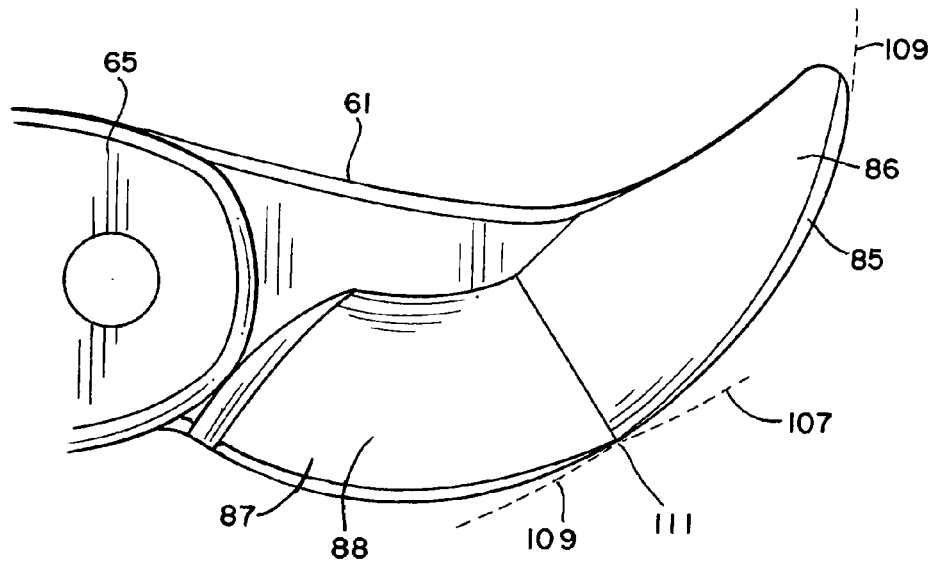
FIG. 13 is a front view of the blade for the embodiment of FIG. 8.

FIG. 13 shows the blade 61 in more detail. Blade 61 has two ground cutting areas 86 and 88. The ground area 86 has a cutting edge 85 that lies along a convex arc 109. The ground area 88 has a cutting edge 87 that lies along a convex arc 107. The two arcs intersect at a point 111 which aligns with the stop 93 on the cutting edge of the hook 63. The arc 109 for cutting edge 85 is preferably of a diameter greater than the arc 107 for cutting edge 87. The actual diameters chosen complement the arcs of the cutting edges on hook 63. The diameters are chosen to facilitate trapping larger diameter material between edge 87 of the pruner blade and the edge 91 of hook and facilitating severing of the material with less effort than required by prior art blade arrangement.

Figure 14:
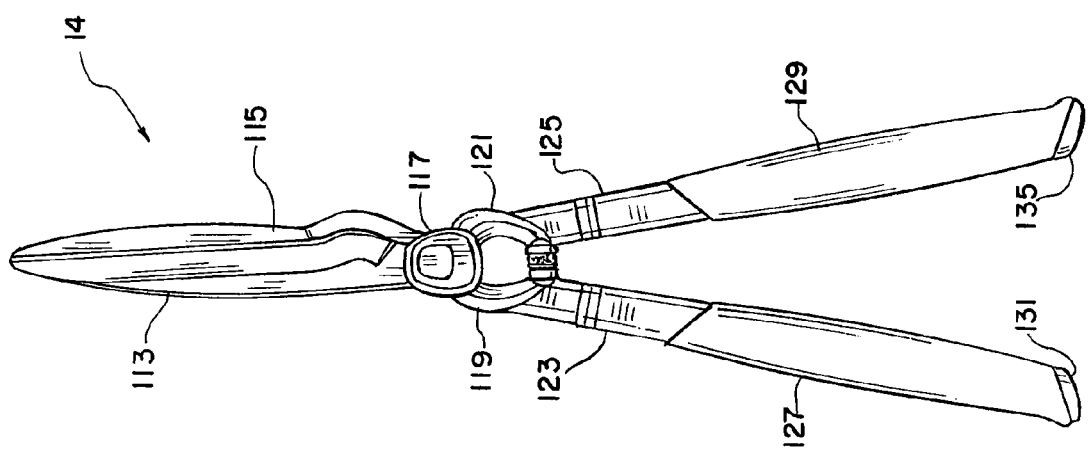
FIG. 14 is a front perspective of an alternate embodiment.

Refer now to FIG. 14, which illustrates yet another alternate preferred embodiment for the invention, in the form of shears 14 having two overlapping blades 113, 115. Blade 115 has a leg 119 which is overlapped by leg 121 of blade 113. The two blades are pivotally connected at area 117 of the overlap. The legs are connected to handles 123, 125 which have cushioned covers 127 and 129. Metal end caps 131, 135 are provided on the ends of the cushioned covers 127, 129 to help prevent damage to the cushioned covered handles.

Figure 15:
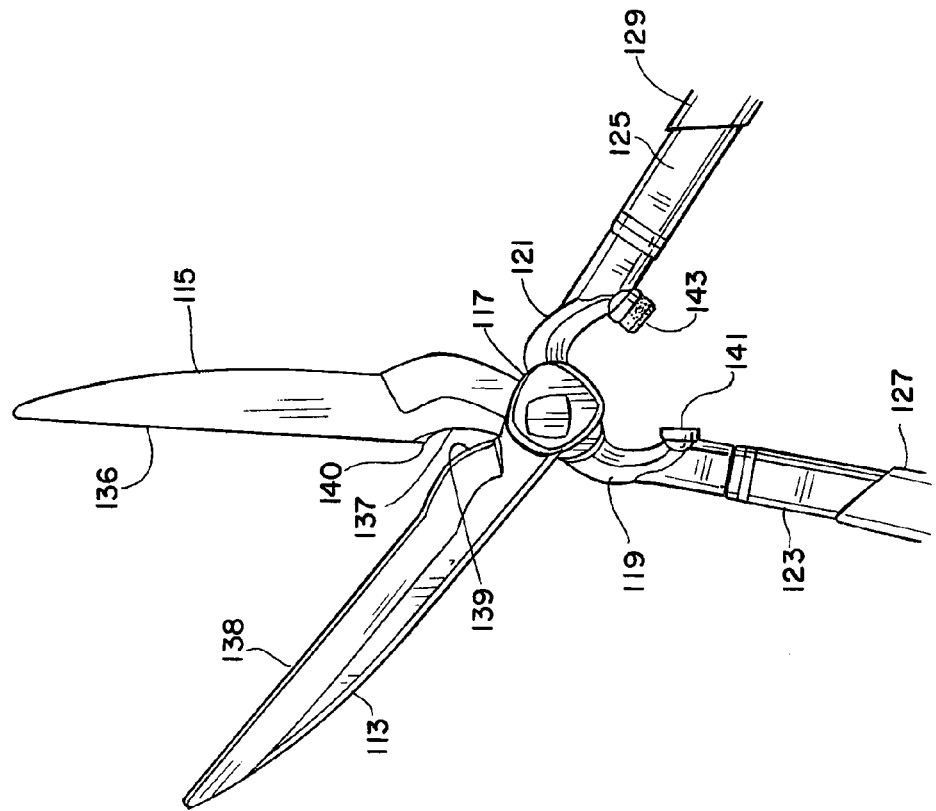
FIG. 15 is a partial front perspective showing the blades for the embodiment of FIG. 14.

As can be seen in FIG. 15, the blade 113 has two distinct cutting sections, a straight edge section 138 along most of the length of blade 113 and a convex curved section 139 closer to the pivotal connection 117. Blade 115 has a straight edge 136 along most of the blade 115 with a concave curved section 137 closer to pivotal connection 117. The intersection of the straight edge 136 and the concave curved edge 137 creates a stop riser 140 on blade 115. Leg 119 of the blade 115 has a knob 141 formed on an inside surface. Leg 121 of blade 113 has a bumper 143 formed on an inside surface. The bumper cushions the impact of the two handles 123, 125 being brought together during cutting.

Figure 16:
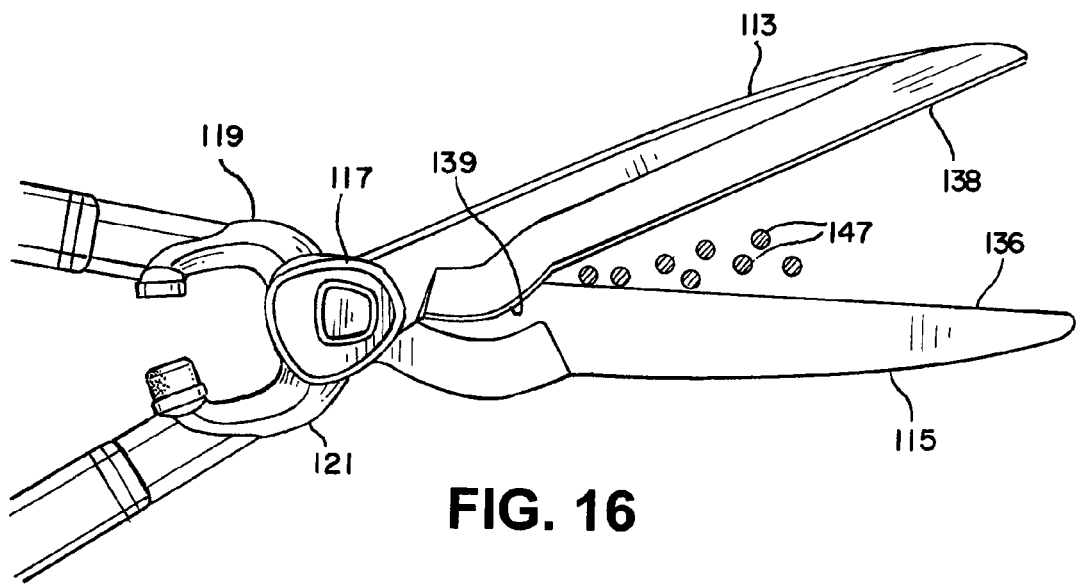
FIG. 16 is a partial front perspective of the blades showing the embodiment of FIG. 14.
Figure 17:
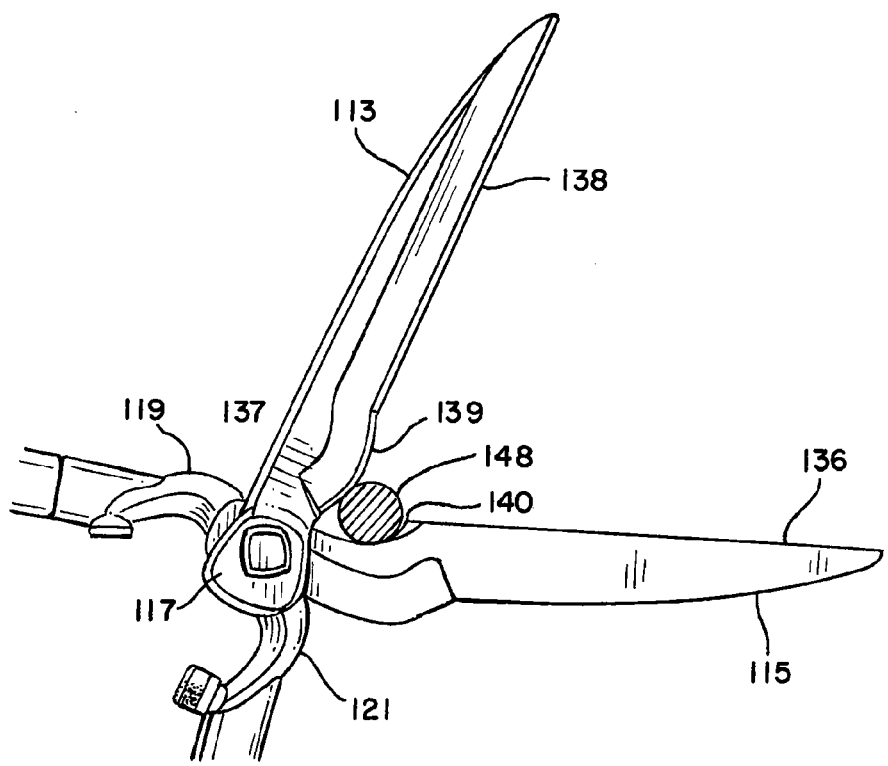
FIG. 17 is a partial front perspective of the blades showing the embodiment of FIG. 14.

As can be seen in FIG. 16, the straight knife cutting edges 138, 136 of blades 113 and 115 are used as shrub clippers to simultaneously cut a plurality of smaller branches 147.

When a larger twig 148 which cannot be severed by the blade edges 136, 138 of the pruning shears needs to be cut, it is moved closer to the pivot 17 of the blades 113, 115 in the area between the stop rise 140 on blade 115 and the pivot 17 of the blades 113, 115. The larger branch 148 is then trapped between cutting edge 139 of blade 113 and cutting edge 137 of blade 115. The cutting edge 137 of blade 115 is designed to lie along a concave arc. The cutting edge 139 of blade 113 lies along a convex arc. Cutting a larger branch 148 between cutting edges 139, 137 of the shears 14 requires less effort to cut the branch without extending the handles too far apart.

What has been described is a second embodiment of hand operated cutting tools having cutting edges that are formed along multiple overlapping arcs resulting in a cutting tool that requires less effort, is more versatile, and easier to use, to cut a variety of different diameter branches and vegetation.

What is claimed is:

1. A hand operated cutting tool comprising:
 a first handle having a near and far end;
 a hook at the far end of the first handle, the hook having a tip and a base with a first cutting edge formed along a first concave arc having a fixed continuous radius of curvature extending from the base, and a second cutting edge formed along a second concave arc overlapping the first concave arc and having a larger fixed continuous radius of curvature extending from the tip, the two cutting edges intersecting at a predefined rise point located between the tip and base;
 a second handle having a near and far end, the second handle pivotally connected to the first handle for movement with respect to the first handle; and
 a cutting blade at the far end of the second handle, the cutting blade having a tip and a base with a first cutting edge formed along a first convex arc having a fixed continuous radius of curvature substantially matching the fixed continuous radius of curvature of the first concave arc on the hook, and a second cutting edge formed along a second convex arc overlapping the first convex arc, having a fixed continuous radius of curvature larger than the fixed continuous radius of curvature of the first convex arc and substantially matching the fixed continuous radius of curvature of the second concave arc on the hook, the two cutting edges intersecting at a predetermined point located between the tip and base and aligned with the predefined rise point on the hook.

2. The hand operated cutting tool of claim 1 further comprising a metal cap at the near end of the first handle, and a metal cap at the near end of the second handle.

3. The hand operated cutting tool of claim 1 further comprising a first cup formed between the first handle and hook and a second cup formed between the second handle and cutting blade, at the pivotal connection between the first handle and second handle.

4. A hand operated cutting tool comprising:
 a first handle having a near and far end;
 a hook at the far end of the first handle, the hook having a tip and a base with a first cutting edge formed along a first concave arc having a fixed continuous radius of curvature extending from the base, and a second cutting edge formed along a second concave arc overlapping the first concave arc and having a larger fixed continuous radius of curvature extending from the tip, the two cutting edges intersecting at a predefined rise point located between the tip and base;
 a second handle having a near and far end, the second handle pivotally connected to the first handle for movement with respect to the first handle; and
 a cutting blade at the far end of the second handle, the cutting blade having a tip, a base, and a first and second side, the cutting blade including a first cutting section with a first and second side and a first cutting edge formed along a first convex arc having a fixed continuous radius of curvature substantially matching the fixed continuous radius of curvature of the first concave arc on the hook, and a second cutting section with a second cutting edge formed along a second convex arc overlapping the first convex arc, having a fixed continuous radius of curvature larger than the fixed continuous radius of curvature of the first convex arc and substantially matching the fixed continuous radius of curvature of the second concave arc on the hook,
 the two cutting sections intersecting at a predetermined intersection line located between the tip and base and aligned with the predefined rise point on the hook, the first cutting section being ground on the first side to taper from the predetermined intersection line to a portion of the base proximal to the far end of the second handle, and the second cutting section being ground on the first side to taper inwardly from the predetermined intersection line to a tip end at the second cutting section.

* * * * *